No. 106.

REISSUED JAN. 25, 1848.

F. P. DIMPFEL.

CONSTRUCTION OF FAN BLOWERS.

UNITED STATES PATENT OFFICE.

F. P. DIMPFEL, OF PHILADELPHIA, PENNSYLVANIA.

IMPROVEMENT IN THE CONSTRUCTION OF FAN-BLOWERS.

Specification forming part of Letters Patent No. 1,448, dated December 28, 1839; Reissue No. 106, dated January 25, 1848.

*To all whom it may concern:*

Be it known that I, FREDERICK P. DIMPFEL, formerly of the city, county, and State of New York, but now of the city and county of Philadelphia, and State of Pennsylvania, have invented new and useful Improvements in Rotating Fan-Wheels or Blowing Apparatus; and I do hereby declare that the following is a full, clear, and exact description of the principle or character which distinguishes them from all other things before known, and of the manner of making, constructing, and using the same, reference being had to the accompanying drawings, making part of this specification, in which—

Figure 1:
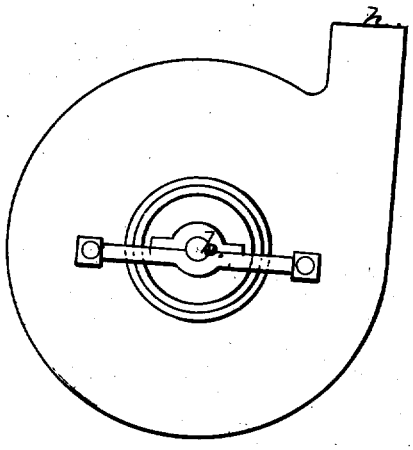
Figure 2:
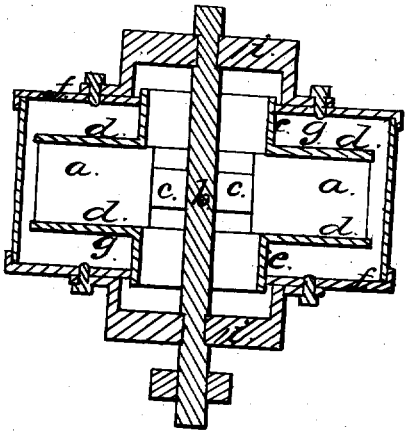

Figure 1 is an elevation of the blower; Fig. 2, a vertical section taken at a plane parallel with and through the axis; and Figs. 3 and 4, sections of modifications of the blower, taken at right angles to the axis.

The same letters indicate like parts in all the figures.

The fan-blower as improved by me consists of vanes that rotate with and are attached to a shaft or arbor by means of arms, rods, or other analogous device, the sides thereof being wholly or partly inclosed by circular rings attached to the sides of the vanes and rotating with them, sufficient space being left between the inner periphery of the rings and the shaft for the free admission of air, which is thence, by the rotation of the fan, carried out and discharged at the outer periphery of the fan into a casing which surrounds and extends down on each side thereof to collars extending out from the inner periphery of the rings that inclose the vanes, the space between the rings and the outer casing at the sides of the fan constituting portions of the outer air-chamber, in which the air is accumulated from the fan and from which it is discharged through a spout, pipe, nozzle, or other like contrivance; and the nature of the first part of my invention in the said rotating fan-blower consists in inclosing the sides of the fan or blowing wheel—that is, the vanes thereof—by means of circular rings which rotate with them, instead of having the vanes to rota e within and next to the outer casing.

The second part of my invention consists in extending the outer case or air-chamber which surrounds the fans or blowing wheel, and which receives the air therefrom, down on the side or sides of the fan, whereby the capacity of the said air-chamber is increased; and the third part of my invention consists in forming the inner periphery of the air-chamber that surrounds the fans by means of a collar for each ring, whether attached to the ring and rotating therewith or attached to the outer case and the ring rotating on or against it.

In the accompanying drawings, *a a* represent vanes, such as are usually employed in the construction of fan-blowers, and connected with the central shaft, *b*, by means of arms *c c*, in the usual manner.

The sides of this fan are inclosed with rings *d d*, attached thereto, and making part of the rotating fan or blowing-wheel, and these rings I prefer to make of such size as to extend from the inner to the outer edge of the vanes, thus leaving a space in each between the inner periphery and the shaft for the free entrance of the air to the fan. The inner periphery of the rings is formed each with a tubular collar, *e*, to run in contact with the inner face or inner edge of the sides of an outer case, *f*, which surrounds the fan or blowing wheel to form a chamber, *g*, for the reception of the air as it is discharged therein from the periphery of the fan by the rotation thereof, the said air-chamber being thus extended down on each side of the fan or blowing wheel to increase its capacity that the air may accumulate therein. This outer case is provided with a discharge spout or nozzle, *h*, at any desired part, for the delivery of the blast; but it will be found best to make it tangential to the outer periphery of the case.

The shaft of the fan is sustained by and has its bearings in boxes made in bars *i i*, attached to the outer case and extending across the apertures through which the air is admitted to the fan or blowing wheel.

Figure 3:
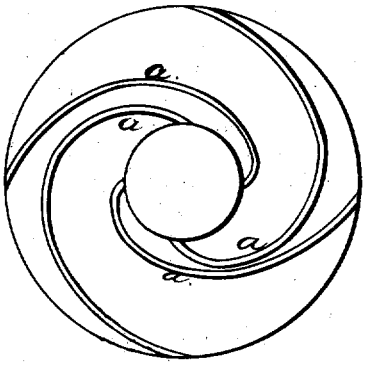
Figure 4:
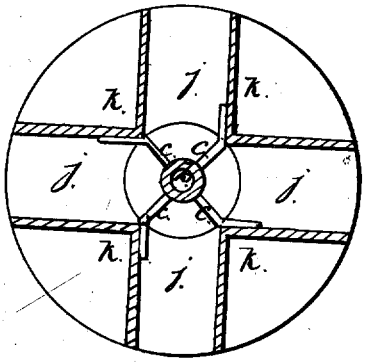

The fan or blowing wheel may be variously formed without changing the principle of my invention—as, for instance, the vanes, instead of being radial may be curved, as shown in Fig. 3, or they may be made of quadrant-pieces *k k k k*, with spaces *j j* between them for the passage of the air from the hollow space between the shaft and the rings to the periphery, where it is delivered into the surrounding case or air-chamber; or instead of having the vanes extend the whole width of the rings from their inner to their outer periphery, they may be made longer or shorter at discretion; or, instead of extending from one ring to the other they may be composed of ribs attached to the inner face of the rings with an open space between them. In short, they may be variously changed in form, size, or extent without changing the principle of my invention; but I have found that when made as first described they produce a good, if not the best, effect.

It will be obvious that the collars that form the inner part of the surrounding air-chamber may be either attached to the rings of the fan and rotate with them, or they may be attached to the sides of the outer case, or they may be divided and part attached to the sides of the case, and part to the rings, and where the rotating part runs against or near to the permanent part the joint may be packed or not, at pleasure.

It will be observed from the foregoing that the first and second parts of my invention may be employed independently of each other, and produce a useful result, although when all are used in connection the best results will be produced—as, for instance, the advantages arising from the use of the rings attached to and rotating with the fan-vanes may be obtained without the use of the extension of the outer case down at the side or sides of the fan or blowing wheel, and in like manner the advantage derived from the use of the extension of the air-chamber at the side or sides may be obtained without having the rings to rotate with the fans or blowing-wheel.

If desired, one of the rims or rings that inclose the vanes of the fan and one side of the outer case may be extended down to the shaft, in which case the collar on that side will be dispensed with, as also one of the passages for the admission of the air to the fan.

What I claim as my invention, and desire to secure by Letters Patent, is—

1. Making the fan or blowing wheel with side rims or rings, attached to and rotating therewith, substantially as herein described, in combination with the surrounding air-chamber, irrespective of the extension of the said air-chamber at the sides of the fan or blowing wheel, and irrespective of the collar or collars.

2. The extension of the surrounding air-chamber or air-reservoir down at the side or sides of the fan or blowing wheel, substantially as described, irrespective of the rims that inclose the fans or blowing-wheel, whereby the capacity of the said air-chamber is increased without enlarging its diameter, as described.

3. The employment of the collar or collars, substantially as described, in combination with the outer case and the fan or blowing wheel, made with or without the rims that inclose the fan or blowing wheel.

4. The collar or collars, substantially as described, when combined with the fan or blowing wheel, in combination with the extension of the air-chamber at the side or sides of the fan or blowing wheel.

5. The combination of the extension of the surrounding air-chamber down on the side or sides of the fan or blowing wheel, in combination with the rims or rings that inclose the fans or blowing-wheel, as described, and these thus combined in combination with the collar or collars, substantially as herein described.

F. P. DIMPFEL.

Witnesses:

A. CAMPBELL,

M. CAMPBELL.